F. V. WINFREY.
SHOVEL PLOW.
APPLICATION FILED MAR. 6, 1913.

1,201,127.

Patented Oct. 10, 1916.

Witnesses
W. C. Fielding.

Inventor
F. V. Winfrey,
By Chandler & Chandler
Attorneys

UNITED STATES PATENT OFFICE.

FRANK V. WINFREY, OF LOWELL, OREGON.

SHOVEL-PLOW.

1,201,127.  Specification of Letters Patent.  Patented Oct. 10, 1916.

Application filed March 6, 1913.  Serial No. 752,484.

*To all whom it may concern:*

Be it known that I, FRANK V. WINFREY, a citizen of the United States, residing at Lowell, in the county of Lane, State of Oregon, have invented certain new and useful Improvements in Shovel-Plows; and I do hereby declare the following to be a full, clear, and exact description of the invention, such as will enable others skilled in the art to which it appertains to make and use the same.

This invention is directed to improvements in shovel plows, and has for its object to provide a plow of this type with wings.

A further object of the invention is to so construct a plow of this type so that the wings may be easily and quickly adjusted at different angles in respect to the shovel of the plow.

A still further object of the invention is to provide a plow with hingedly connected wings which are readily adjusted so as to increase or diminish the size of the furrow as the occasion may require.

With these and other objects in view, this invention resides in the novel features of construction, formation, combination, and arrangement of parts to be hereinafter more fully described, claimed and illustrated in the accompanying drawing, in which:—

Figure 1:
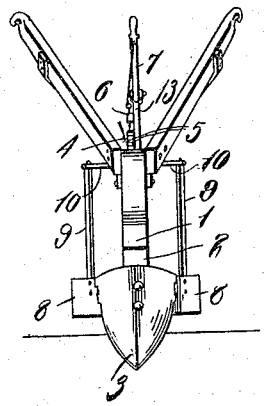
Figure 2:
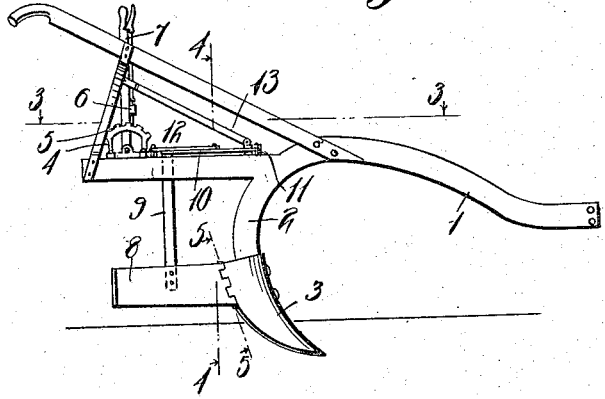
Figure 4:
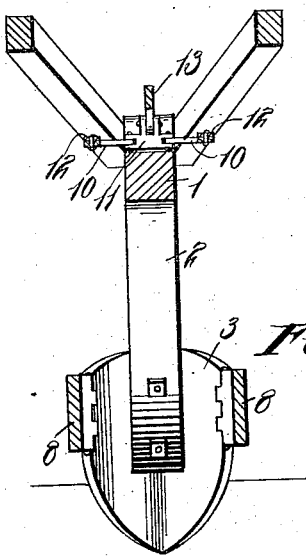
Figure 3:
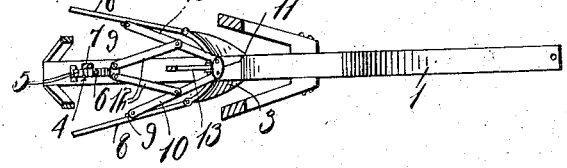
Figure 5:
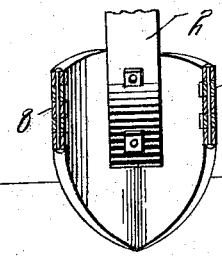
Figure 6:
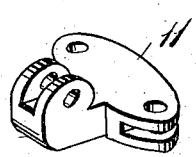

Figure 1 is a front elevation of the device. Fig. 2 is a side view. Fig. 3 is a sectional view on line 3—3 of Fig. 2. Fig. 4 is a similar view on line 4—4 of Fig. 2. Fig. 5 is a similar view on line 5—5 of Fig. 2. Fig. 6 is a detail perspective view of the block.

Referring to the drawing, the numeral 1 designates a plow beam, preferably formed from metal and having depending therefrom a standard 2, and to which is secured in any suitable manner a shovel 3. Mounted adjacent the rear end of the beam 1 is a segment 4, the teeth 5 of which are engaged by the spring pressed pawl 6 carried by the hand lever 7, the lower end of which is pivotally connected to the segment 4. Hingedly connected to the sides of the shovel 3 are wings 8, and to which are bolted the lower ends of the uprights 9, the upper ends of said uprights being pivotally connected to the outer ends of the bars 10, the inner ends of said bars being similarly connected to a block 11, which is adapted for longitudinal sliding movement upon the beam 1. Pivotally connected intermediate the ends of the bars 10 are the forward ends of the links 12, the rear ends of said links being pivotally connected to the forward end of the segment 4. Pivotally connected at its outer end to the rear end of the block 11 is an arm 13, the rear end of which is pivotally connected to the hand lever 7.

From this construction it will be seen that when it is desired to swing the wings 8 at different angles in respect to the shovel 3, it is only necessary to shift the lever 7, which through the medium of the arm 13 will slide the block 11 backwardly and forwardly, which oscillates the bars 10, which owing to their connection with the uprights 9 shifts the wings to the angles desired.

What is claimed is:—

In a plow, the combination with a beam, of a plow point on the lower end thereof, the said beam having an arm extending rearwardly therefrom above the plow point, wings hinged to the plow point and means for adjusting the wings including a pair of bars hinged thereto, a block having a broad flat face slidable on the extension of the plow beam and having a pair of ears extending from each side thereof between which the bars are pivoted in such manner that they will be held out of contact with the extension of the plow beam, the said blocks having a pair of upwardly extending ears located to the rear of the first mentioned ears, an adjusting link pivoted between the last mentioned ears and a pair of links pivoted to the extension of the plow beam and to the bars intermediate their ends.

In testimony whereof, I affix my signature, in the presence of two witnesses.

FRANK V. WINFREY.

Witnesses:
 DAISY HYLAND,
 MABELL SAUVAGO.

Copies of this patent may be obtained for five cents each, by addressing the "Commissioner of Patents, Washington, D. C."